Patented June 5, 1945

2,377,779

UNITED STATES PATENT OFFICE 2,377,779

PROCESS FOR POLYMERIZING ETHYLENE

William Edward Hanford and John Richard Roland, Wilmington, Del., and Howard Sargent Young, Fairville, Pa., assignors to E. I. du Pont de Nemours & Company, Wilmington, Del., a corporation of Delaware No Drawing. Application February 18, 1942, Serial No. 431,380

16 Claims. (Cl. 260—94)

This invention relates to polymerization processes and more specifically to a new and improved process for the polymerization of ethylene.

The utilization of ethylene as a polymer forming chemical is extremely attractive commercially and as a consequence its polymerization has been the object of a large number of investigations. Most of these investigations have involved the use of a silent electric discharge or of metal halides, or organic compounds yielding free radicals under the reaction conditions as catalysts as described, for example, in "The Chemistry of Synthetic Resins" by Carleton Ellis. Generally, however, the products obtained by these prior art processes have been oils or soft greases.

One process which has been an exception to the prior art, in giving solid or semi-solid end products is that described in U. S. Patent 2,153,553, wherein ethylene is heated to between 100° to 400° C. under pressures of from 500 atmospheres upwards, preferably in the presence of a small amount of molecular oxygen to catalyze the reaction.

It is an object of the present invention to provide polymers of ethylene which are normally solid. It is another object to provide an improved method for polymerizing ethylene to products which are normally solid.

Other objects and advantages of the invention will be apparent from the following specification.

The above and other objects of the present invention are accomplished by heating substantially oxygen-free ethylene in the presence of a normally liquid non-polymerizable organic medium in contact with an organolithium compound and in the absence of hydrogenating catalysts.

In the practice of this invention any organolithium compound can be used as a catalyst, although the preferred classes are the alkyllithiums and the aryllithiums, such as methyllithium, n-butyllithium, isoamyllithium, octyllithium, dodecyllithium, phenyllithium, and benzyllithium. These are conveniently prepared by the method of Ziegler and Colonius (Ann. 479, 135 (1930)) though any other method can be used. In the method of Ziegler and Colonius the organolithium compound is prepared by the reaction of an appropriate chloro or bromo hydrocarbon with a hydrocarbon suspension of clean lithium metal. The reaction between organic halides and lithium proceeds best if carried out at a slightly elevated temperature under an atmosphere of inert gas. Certain organolithium compounds, such as phenyllithium, do not show a high rate of reaction with oxygenated solvents, and for the preparation of these diethyl ether may be used as a solvent.

The concentration of catalyst required in the practice of this invention can vary over a wide range. For reasons of economy and in order to obtain products of the best molecular weight, however, it is generally desirable to use low concentrations of catalyst, for example, from about 0.01% to about 1%. Lower molecular weight products may be desirable for many uses, and these are conveniently prepared with catalyst concentrations up to 15% or more, based on the amount of polymerizable monomer.

As solvents for use in this invention, nonpolymerizable normally liquid organic compounds are suitable. It is generally preferable to use saturated aliphatic and aromatic hydrocarbons such as benzene, isooctane, toluene, petroleum ether, and the like. Many oxygenated solvents react with alkyllithiums. Aryllithiums, however, show lower reactivity with oxygenated solvents, and with these it is convenient to use a solvent such as diethyl ether.

The most critical feature of this invention is the purity of the ethylene employed and particularly its oxygen content. The ethylene may contain traces of methane, ethane, propane, nitrogen, or hydrogen, or other olefines although the proportions of other olefins should be kept low since, in general, other olefins tend to lower the softening point of the product.

Inasmuch as oxygen is the most critical of the impurities that may be encountered in ethylene, commercial ethylene is not suitable for use in practicing our invention, containing as it does up to 1500 P. P. M. and more of oxygen.

Specially purified ethylene containing less than 1000 P. P. M. of oxygen (0.1%) and preferably less than 500 P. P. M. of oxygen is desirable for the practice of this invention. Such a quality of ethylene may be conveniently prepared by deoxygenating commercial ethylene over a reduced copper catalyst or by fractional distillation of commercial ethylene. By these processes the oxygen content is easily reduced to between 10 and 20 P. P. M. and with greater care this can be reduced to less than 5 P. P. M. if desired.

The general effect of increasing the temperature is to accelerate the rate of reaction but this increase in reaction rate is accompanied by a decrease in the molecular weight of the polymer. In the practice of this invention there can be used temperatures in the range of 25° to 350° C. It is generally preferred, however, to operate at temperatures in the range of 50° to 150° C., since within this range products having the best combination of properties are obtained at a practical reaction rate.

The molecular weight of ethylene polymers is a function of the pressure used in their preparation. The general effect of increasing the pressure is to increase the molecular weight of the polymer and to accelerate the reaction. Any pressure above atmospheric may be used in the practice of this invention, although it is generally preferred to operate in the range of from 20 atmospheres to 1500 atmospheres.

In carrying out the invention the polymerization may be effected in a batch, semi-continuous, or in a continuous process. In one method of carrying out a batch process, a pressure-resistant reaction vessel is charged with a suspension or solution of the organolithium compound, for example, a benzene solution of n-butyllithium. Since the success of this process depends upon rigid exclusion of any substantial amount of molecular oxygen, this charging operation is most suitably effected by use of a separate loading vessel which can be filled with the solution of organolithium compound in vacuum or under an inert gas such as purified nitrogen. In one convenient form the loading vessel and pressure reaction vessel are provided with ground joints which are fitted together through a T. The pressure reaction vessel is evacuated through the T, the latter closed and a cock to the charging vessel opened to admit a measured amount of solution to the reaction vessel. The valve on the reaction vessel is then closed, the charging vessel removed, and the reaction vessel placed in a heated shaker machine. The vessel is then connected to a source of high pressure ethylene, fitted with recording and controlling thermocouples; the valve is opened, ethylene substantially free of oxygen is admitted to the pressure desired and heating and agitation are started. Reaction starts immediately upon reaching the reaction temperature or even spontaneously if high concentrations of catalyst are employed. When reaction is complete, as evidenced by lack of further pressure drop, the vessel is cooled, bled of excess ethylene, opened and the contents discharged. The product is isolated by simple distillation or by steam distillation of the solvent, followed by drying.

The following examples illustrate in detail the practice of this invention and demonstrate operable conditions. Parts given are by weight unless otherwise specified.

Example 1

A stainless steel-lined vessel is charged with 8.8 parts of n-butyllithium in 250 parts by volume of benzene. The vessel is closed, placed in a shaker machine and pressured with ethylene as described above. During a reaction time of 16.4 hours, throughout which the temperature is maintained at 68–88° C. and the pressure at 600–955 atmospheres, the total observed pressure drop is 390 atmospheres. After this, the vessel is cooled, bled of excess ethylene, opened, and the reaction mixture discharged. The polymer is isolated by steam distillation of the benzene, followed by filtration and drying. There is thus obtained 40 parts of a hard, waxy polymer having an intrinsic viscosity of 0.23 (0.25% in xylene at 85° C.).

The ethylene used in this example contains about 20 P. P. M. of oxygen. The excellent quality of this polymer, along with its ease of isolation, illustrates the advantages of this invention.

Example 2

A stainless steel-lined reaction vessel containing 10 parts of phenyllithium in 150 parts by volume of ether is charged with ethylene as described in Example 1. In a reaction time of 16.5 hours at 56° to 73° C. and 405 to 950 atmospheres ethylene pressure, the total observed pressure drop is 420 atmospheres. The product, isolated as before, amounts to 100 parts of a hard wax. This product has the same intrinsic viscosity characteristics as the product of Example 1.

Example 3

Following the operative details of Example 1, a stainless steel-lined vessel is charged with 4.3 parts of n-butyllithium in 100 parts by volume of benzene. In a reaction time of 17 hours at 20° to 26° C. and 905 to 970 atmospheres ethylene pressure, there is an observed pressure drop of about 50 atmospheres. This reaction yields 4.5 parts of a hard, waxy, polymer which has an intrinsic viscosity of 0.63 (0.25% in xylene at 85° C.) and which melts at 119° to 121° C.

Example 4

In a manner such as described in Example 1, a silver-lined reaction vessel is charged with 0.4 part of n-butyllithium in 250 parts by volume of isooctane. In a reaction time of 17.75 hours at 98° to 100° C. and 755 to 990 atmospheres ethylene pressure, the observed pressure drop totals 555 atmospheres. This reaction yields 30 parts of hard, waxy polymer.

Various changes may be made in the details and preferred embodiments of this invention without departing therefrom or sacrificing any of the advantages thereof.

We claim:

1. In a process for producing ethylene polymers which comprises heating ethylene in a non-polymerizable organic liquid medium, in the presence of a material selected from the group consisting of alkyl and aryl lithium compounds as the sole catalyst, the step which comprises carrying out the process with ethylene containing less than 1000 parts per million of oxygen.

2. In a process for producing ethylene polymers which comprises heating ethylene in a non-polymerizable organic liquid medium, in the presence of from 0.01 to 15% of a material selected from the group consisting of alkyl and aryl lithium compounds as the sole catalyst, the step which comprises carrying out the process with ethylene containing less than 1000 parts per million of oxygen.

3. In a process for producing ethylene polymers which comprises heating ethylene in a non-polymerizable organic liquid medium, in the presence of from 0.1 to 1% of a material selected from the group consisting of alkyl and aryl lithium compounds as the sole catalyst, the step which comprises carrying out the process with ethylene containing less than 1000 parts per million of oxygen.

4. In a process for producing ethylene polymers which comprises heating ethylene in benzene, in the presence of a material selected from the group consisting of alkyl and aryl lithium compounds as the sole catalyst, the step which comprises carrying out the process with ethylene containing less than 1000 parts per million of oxygen.

5. In a process for producing ethylene polymers which comprises heating ethylene in benzene, in the presence of from 0.01 to 15% of a material selected from the group consisting of alkyl and aryl lithium compounds as the sole catalyst, the step which comprises carrying out the process with ethylene containing less than 1000 parts per million of oxygen.

6. In a process for producing ethylene polymers which comprises heating ethylene in benzene, in the presence of from 0.01 to 1% of a material selected from the group consisting of alkyl and aryl lithium compounds as the sole catalyst, the step which comprises carrying out the process with ethylene containing less than 1000 parts per million of oxygen.

7. In a process for producing ethylene polymers which comprises heating ethylene in a non-polymerizable organic liquid medium, in the presence of a material selected from the group consisting of alkyl and aryl lithium compounds as the sole catalyst, the step which comprises carrying out the process with ethylene containing less than 500 parts per million of oxygen.

8. In a process for producing ethylene polymers which comprises heating ethylene in a non-polymerizable organic liquid medium, in the presence of from 0.01 to 1% of a material selected from the group consisting of alkyl and aryl lithium compounds as the sole catalyst, the step which comprises carrying out the process with ethylene containing less than 500 parts per million of oxygen.

9. In a process for producing ethylene polymers which comprises heating ethylene in benzene, in the presence of a material selected from the group consisting of alkyl and aryl lithium compounds as the sole catalyst, the step which comprises carrying out the process with ethylene containing less than 500 parts per million of oxygen.

10. In a process for producing ethylene polymers which comprises heating ethylene at a temperature of 25 to 350° C., in a non-polymerizable organic liquid medium, in the presence of a material selected from the group consisting of alkyl and aryl lithium compounds as the sole catalyst, the step which comprises carrying out the process with ethylene containing less than 1000 parts per million of oxygen.

11. In a process for producing ethylene polymers which comprises heating ethylene at a temperature of 25 to 350° C., in a non-polymerizable organic liquid medium, in the presence of from 0.01 to 15% of a material selected from the group consisting of alkyl and aryl lithium compounds as the sole catalyst, the step which comprises carrying out the process with ethylene containing less than 1000 parts per million of oxygen.

12. In a process for producing ethylene polymers which comprises heating ethylene at a temperature of 25 to 350° C., in a non-polymerizable organic liquid medium, in the presence of from 0.01 to 1% of a material selected from the group consisting of alkyl and aryl lithium compounds as the sole catalyst, the step which comprises carrying out the process with ethylene containing less than 1000 parts per million of oxygen.

13. In a process for producing ethylene polymers which comprises heating ethylene in benzene, in the presence of from 0.01 to 15% of a material selected from the group consisting of alkyl and aryl lithium compounds as the sole catalyst, the step which comprises carrying out the process with ethylene containing less than 500 parts per million of oxygen.

14. In a process for producing ethylene polymers at a temperature of 50 to 150° C., in a non-polymerizable organic liquid medium, in the presence of a material selected from the group consisting of alkyl and aryl lithium compounds as the sole catalyst, the step which comprises carrying out the process with ethylene containing less than 1000 parts per million of oxygen.

15. In a process for producing ethylene polymers which comprises heating ethylene at a temperature of 50 to 150° C. in benzene, in the presence of a material selected from the group consisting of alkyl and aryl lithium compounds as the sole catalyst, the step which comprises carrying out the process with ethylene containing less than 1000 parts per million of oxygen.

16. In a process for producing ethylene polymers which comprises heating ethylene at a temperature of 50 to 150° C. in benzene, in the presence of a material selected from the group consisting of alkyl and aryl lithium compounds as the sole catalyst, the step which comprises carrying out the process with ethylene containing less than 500 parts per million of oxygen.

WILLIAM EDWARD HANFORD.
JOHN RICHARD ROLAND.
HOWARD SARGENT YOUNG.